(12) United States Patent
Ecabert et al.

(10) Patent No.: US 9,129,387 B2
(45) Date of Patent: Sep. 8, 2015

(54) PROGRESSIVE MODEL-BASED ADAPTATION

(75) Inventors: Olivier Ecabert, Aachen (DE); Peters Jochen, Aachen (DE); Juergen Weese, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1092 days.

(21) Appl. No.: 11/917,937

(22) PCT Filed: Jun. 20, 2006

(86) PCT No.: PCT/IB2006/051983
§ 371 (c)(1),
(2), (4) Date: Dec. 18, 2007

(87) PCT Pub. No.: WO2006/137013
PCT Pub. Date: Dec. 28, 2006

(65) Prior Publication Data
US 2010/0145661 A1 Jun. 10, 2010

(30) Foreign Application Priority Data
Jun. 21, 2005 (EP) .................................... 05105485

(51) Int. Cl.
*G06F 17/50* (2006.01)
*G06T 7/00* (2006.01)

(52) U.S. Cl.
CPC .............. *G06T 7/0089* (2013.01); *G06T 7/0083* (2013.01); *G06T 2207/10072* (2013.01); *G06T 2207/30004* (2013.01); *G06T 2207/30008* (2013.01)

(58) Field of Classification Search
CPC ........... G06T 2207/30004; G06T 2207/30008; G06T 2207/10072
USPC .......................................................... 703/2
See application file for complete search history.

(56) References Cited

U.S. PATENT DOCUMENTS

| 5,559,901 | A | * | 9/1996 | Lobregt | ........................ 382/256 |
| 5,926,568 | A | * | 7/1999 | Chaney et al. | ................ 382/217 |

(Continued)

FOREIGN PATENT DOCUMENTS

| EP | 039417 A1 | 9/2000 |
| WO | 02073536 A2 | 9/2002 |

(Continued)

OTHER PUBLICATIONS

Jurgen Weese, Michael Kaus, Christian Lorenz, Steven Lobregt, Roel Truyen, Vladimir Pekar, "Shape Constrained Deformable Models for 3D Medical Image Segmentation" Springer-Verlag Berlin Heidelberg 2001, pp. 380-387.*

(Continued)

*Primary Examiner* — Dwin M Craig (57) ABSTRACT

The invention relates to an adaptation system for adapting a deformable model comprising a plurality of model elements to an object of interest in an image data set, the adaptation system comprising a selector for selecting at least one image-driven model element from the plurality of model elements and an adapter for adapting the deformable model on the basis of optimizing a model energy of the deformable model, the model energy comprising an internal energy of the plurality of model elements and an external energy of the at least one image-driven model element, thereby adapting the deformable model. By enabling the adaptation system to selectively choose the image-driven model elements, the adaptation system of the current invention allows excluding a poorly adaptable model element from interacting with the image data set and thus from being pulled and/or pushed by the image data set into a wrong location.

17 Claims, 5 Drawing Sheets

(56) References Cited

U.S. PATENT DOCUMENTS

| | | | |
|---|---|---|---|
| 6,594,378 B1 * | 7/2003 | Li et al. | 382/128 |
| 2002/0172406 A1 | 11/2002 | Rouet et al. | |
| 2002/0184470 A1 | 12/2002 | Weese et al. | |

FOREIGN PATENT DOCUMENTS

| | | |
|---|---|---|
| WO | 2004010374 A2 | 1/2004 |
| WO | 2004010382 A1 | 1/2004 |
| WO | 2004111936 | 12/2004 |
| WO | 2004111937 A1 | 12/2004 |
| WO | 2005008587 | 1/2005 |

OTHER PUBLICATIONS

McInerney T et al: "Deformable Models in Medical Image Analysis", Proceedings of the IEEE Workshop on Mathematical Methods in Biomedical Image Analysis, pp. 171-180, 1995, XP001179897.

Weese J, et al: "Shape Constrained Deformable Models", Lecture Notes in Computer Science, vol. 2082, pp. 380-387, 2001, XP009027152.

Remin Lin Wei and Wei-Chung Lin: "Adaptive Finite-Element Meshes", Proceedings of ICPR 1996, IEEE, pp. 125-129.

T.F. Cootes and C.J. Taylor: "Statistical Modesl of Appearance", Proc. SPIE Medical Imaging, 2001.

Kaus, M. et al. "Automated segmentation of the left ventricle in cardiac MRI", Medical Image Analysis 8 (2004) 245-254.

* cited by examiner

PROGRESSIVE MODEL-BASED ADAPTATION

BACKGROUND OF THE INVENTION

This invention relates to an adaptation system for adapting a deformable model comprising a plurality of model elements to an object of interest in an image data set.

The invention further relates to an acquisition system for acquiring an image data set comprising said adaptation system.

The invention further relates to a workstation comprising said adaptation system.

The invention further relates to a method of adapting a deformable model comprising a plurality of model elements to an object of interest in an image data set.

The invention further relates to a computer program product to be loaded by a computer arrangement, comprising instructions for adapting a deformable model comprising a plurality of model elements to an object of interest in an image data set.

An embodiment of the adaptation method of the kind described in the opening paragraph is known from an article "Shape constrained deformable models for 3D medical image segmentation" by J. Weese, V. Pekar, M. Kaus, C. Lorenz, S. Lobregt, and R. Truyen, hereinafter referred to as ref. 1, published in $17^{th}$ International Conference on Information Processing in Medical Imaging (IPMI), pages 380-387, Davis, Calif., USA, 2001, Springer Verlag. This article describes a method employing a deformable model represented by the triangular mesh. The triangles of the mesh interact with each other via internal forces. The internal forces oppose model deformations. In addition, each triangle is attracted via an external force to its detected corresponding target location in the image. In that sense, the location of each triangle is image-driven. The model energy is defined as a sum of an internal energy term, which depends on the locations of the triangles relative to each other, and on an external energy term, which depends on the locations of the triangles relative to their corresponding detected locations in the image. The two terms correspond to the aforementioned internal and external forces, respectively. At the minimum of the model energy all forces acting on the model are balanced and the model is at equilibrium. Finding the equilibrium locations of the triangles of the triangular mesh representing the deformable model, said locations corresponding to the minimum of the model energy, yields the adapted deformable model. The adapted deformable model is used to describe the shape and structures of the object of interest. The results of a study of CT images published in ref. 1 show a good overall adaptation of the employed deformable model as reflected by the mean distance between the surfaces of the deformable model and of accurate reference segmentation. There are, however, a few problematic areas in the deformable model, where distances between the surfaces of the adapted deformable model and of the accurate reference segmentation of the object of interest may exceed a few times the mean distance.

BRIEF SUMMARY OF THE INVENTION

It is an object of the invention to provide an adaptation system of the kind described in the opening paragraph that reduces the problematic areas of the deformable model.

This object of the invention is achieved in that the adaptation system for adapting a deformable model comprising a plurality of model elements to an object of interest in an image data set, comprises:

a selector for selecting at least one image-driven model element from the plurality of model elements; and an adapter for adapting the deformable model on the basis of optimizing a model energy of the deformable model, said model energy comprising an internal energy of the plurality of model elements and an external energy of the at least one image-driven model element, thereby adapting the deformable model.

A model element from the plurality of model elements comprises information on a surface area of the deformable model. In addition to the shape of the surface area the model element commonly comprises the location and the orientation of the surface area. An example of a model element is a polygon of a polygonal mesh representing the deformable model. The adaptation system of the current invention is arranged to initialize the deformable model by assigning shapes, locations and orientations to the model elements. The selector of the current adaptation system is arranged to select at least one image-driven model element, which is going to interact with the image data set. The information on whether or not a model element is an image-driven model element can be comprised in the model element along with the shape, location, and orientation of its surface area. The selector can be arranged to obtain this information. The adapter is arranged to optimize the model energy, for example, to compute the locations and orientations of the model elements corresponding to the minimum of the model energy. The model energy comprises an internal energy contribution, which depends on the locations of the model elements relative to each other. Further, the model energy comprises an external energy contribution, which depends on the locations of the image-driven model elements, selected by the selector, relative to the image data set. The external forces, responsible for the external energy contribution, may attract and/or repulse the image-driven model elements to their target locations and/or from the false locations, respectively, in the image data set. The locations of the model elements corresponding to the minimum of the model energy describe the resulting adapted deformable model.

By enabling the adaptation system to selectively choose the image-driven model elements, the adaptation system of the current invention allows to exclude a poorly adaptable model element from interacting with the image data set and thus from being pulled and/or pushed by the image data set into a wrong location. Candidate model elements to be excluded from interacting with the image data set can be determined, for example, by identifying the problematic areas in the deformable model adapted to a training set of image data sets. Excluding the model elements comprised in the problematic areas from interacting with the image data set reduces these problematic areas of the deformable model The adaptation system of the present invention is useful for adapting a deformable model to an object of interest in a multidimensional image data set, in particular in a 2D, in a 3D, or in a 4D image data set. The image data set can be obtained from any one of the many imaging modalities. The image data set can be, for example, a volumetric Magnetic Resonance Imaging (MRI) data set (i.e. 3D), a time-dependent volumetric Computed Tomography (CT) image data set (i.e. 4D), or a planar X-ray image (i.e. 2D).

In an embodiment of the adaptation system according to the invention optimizing the model energy is based on optimizing the model force field. The field of gradients of the model energy uniquely defines the model force field. Thus, optimizing the model energy can be carried out by means of optimizing the force field. For example, finding locations of model elements corresponding to the minimum of the model energy can be accomplished on the basis of finding locations of model elements corresponding to a model force field substantially mutually equal to a null force field.

In an embodiment of the adaptation system according to the invention the selector is arranged to carry out a computation to assist the selecting of the at least one image-driven model element. For example, the selector is arranged to select every model element as an image-driven model element. The adapter is arranged to compute the locations of model elements corresponding to the optimized model energy yielding an adapted deformable model and transferring the result back to the selector. The selector is arranged to partition the adapted deformable model into a number of areas and to compute how well each area fits the image data set, for example by computing a similarity measure of the model area and of the underlying image data set. The selector is further arranged to select the model elements with surface elements comprised in the areas having a similarity measure greater than a certain predefined threshold, as the image-driven model elements.

In a further embodiment of the adaptation system according to the invention the selector is arranged to receive an input for selecting the at least one image-driven model element. For example, the selector is arranged to select every model element as an image-driven model element. The adapter is arranged to compute the locations of model elements corresponding to the optimized model energy and to transfer the adapted deformable model to the selector. The selector is arranged to output the adapted deformable model and the image data set to a display device connected to the adaptation system. The user can visually inspect the adapted deformable model and the displayed image data set and indicate problematic areas in the deformable model. For example, the user can encircle the problematic areas using a user input device connected to the adaptation system such as a mouse or a track ball. The selector is further arranged to receive the user input and to identify the model elements with surface elements comprised outside the encircled areas. Then the selector is arranged to select the identified model elements with surface elements comprised outside the encircled areas as the image-driven model elements.

In a further embodiment of the adaptation system according to the invention the adaptation system comprises an iterator for iteratively adapting the deformable model. The iterator is arranged to compute a condition for terminating the iteration process. If the condition is not satisfied, the iterator is arranged to continue the adaptation process. If the condition is satisfied, the iterator is arranged to terminate the adaptation process.

In a further embodiment of the adaptation system according to the invention the adaptation system comprises an ordering unit for determining an adaptation order of each of the plurality of model elements and wherein the selector is arranged to select the at least one image-driven model element on the basis of the adaptation order and on the basis of an iteration cycle. The ordering unit is arranged to determine the adaptation order of each model element. The selector is arranged to compare the adaptation order of each model element to the iteration count. If the iteration count is equal to or greater than the adaptation order of a model element then the selector is arranged to select this model element as an image-driven model element.

In a further embodiment of the adaptation system according to the invention the adaptation order of the each of the plurality of model elements is determined on the basis of a measure of quality of the each of the plurality of model elements. The feature function comprised in the model element is used to compute the target location of the model element, which attracts the deformable model during the deformable model adaptation, if the model element is an image-driven element. The feature function is optimized for each model element. The quality of the optimized feature function determines the quality of the computed target location and is used for qualifying a model element as an image-driven model element.

In a further embodiment of the adaptation system according to the invention, the adaptation system comprises a visualizer for visualizing the each of the plurality of model elements on the basis of the adaptation order of said each of the plurality of model elements. The visualizer is arranged to assign a unique code, for example a color code, to each adaptation order. The color code corresponding to the model element is applied to the surface element of the model element. The visualizer is arranged to transfer the color-coded deformable model to a display device connected to the adaptation system, thereby visualizing the adaptability of various areas of the deformable model.

In a further embodiment of the adaptation system according to the invention, the adaptation system comprises a segmentation unit for segmenting an object in the image data set on the basis of the adapted deformable model. The segmentation unit for segmenting the object may use the adapted deformable model to carry out the model-based image segmentation.

It is a further object of the invention to provide an acquisition system of the kind described in the opening paragraph that reduces the problematic areas of the deformable model. This is achieved in that the acquisition system comprises an adaptation system for adapting a deformable model comprising a plurality of model elements to an image data set, the adaptation system comprising:
  a selector for selecting at least one image-driven model
    element from the plurality of model elements; and
  an adapter for adapting the deformable model on the basis
    of optimizing a model energy of the deformable model,
    said model energy comprising an internal energy of the
    plurality of model elements and an external energy of the
    at least one image-driven model element, thereby adapting the deformable model.

It is a further object of the invention to provide a workstation of the kind described in the opening paragraph that reduces the problematic areas of the deformable model. This is achieved in that the workstation comprises an adaptation system for adapting an object model to an image data set, the adaptation system comprising:
  a selector for selecting at least one image-driven model
    element from the plurality of model elements; and
  an adapter for adapting the deformable model on the basis
    of optimizing a model energy of the deformable model,
    said model energy comprising an internal energy of the
    plurality of model elements and an external energy of the
    at least one image-driven model element, thereby adapting the deformable model.

It is a further object of the invention to provide a method of the kind described in the opening paragraph that reduces the problematic areas of the deformable model. This is achieved in that the method comprises:
  a selecting step for selecting at least one image-driven
    model element from the plurality of model elements;
    and
  an adapting step for adapting the deformable model on the
    basis of optimizing a model energy of the deformable
    model, said model energy comprising an internal energy
    of the plurality of model elements and an external energy of the at least one image-driven model element, thereby adapting the deformable model.

It is a further object of the invention to provide a computer program product of the kind described in the opening paragraph that reduces the problematic areas of the deformable model. This is achieved in that the computer program product to be loaded by a computer arrangement, comprising instructions for adapting a deformable model comprising a plurality of model elements to an object of interest in an image data set, the computer arrangement comprising a processing unit and a memory, the computer program product, after being loaded, provides said processing unit with the capability to carry out the following tasks:

selecting at least one image-driven model element from the plurality of model elements; and adapting the deformable model on the basis of optimizing a model energy of the deformable model, said model energy comprising an internal energy of the plurality of model elements and an external energy of the at least one image-driven model element, thereby adapting the deformable model.

Modifications and variations thereof, of the acquisition system, of the workstation, of the method, and/or of the computer program product, which correspond to modifications of the adaptation system and variations thereof, being described, can be carried out by a skilled person on the basis of the present description.

These and other aspects of the adaptation system, of the acquisition system, of the workstation, of the method, and of the computer program product according to the invention will become apparent from and will be elucidated with respect to the implementations and embodiments described hereinafter and with reference to the accompanying drawings, wherein:

BRIEF DESCRIPTION OF THE SEVERAL VIEWS OF THE DRAWINGS

Same reference numerals are used to denote similar parts throughout the figures.

DETAILED DESCRIPTION OF THE INVENTION

Figure 1A:
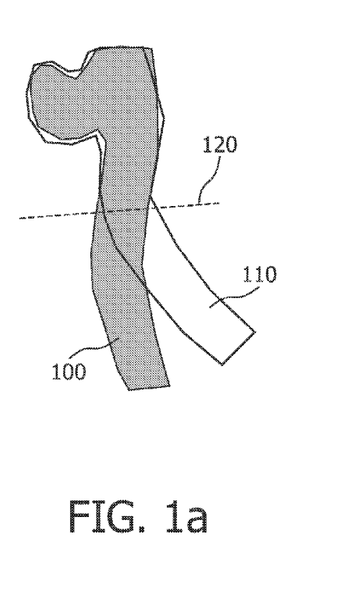
FIG. 1 shows an example of an initialized bone model, which does not globally fit the bone object in the image.

FIG. 1 illustrates the functioning of the adaptation system according to the invention. FIG. 1(a) shows an example of an initialized bone model 110. The bone object 100 represents a femur fragment. The initialized bone model 110 does not globally fit the bone object 100. The upper part of the bone model 110, i.e. the bone model area above the dashed line 120, is well-initialized, while the lower part of the bone model 110, i.e. the bone model area below the dashed line 120, is away from its correct location. Thus, using the method described in ref. 1 for detecting the target locations of the triangles from a triangular mesh representing the bone model in the image, the target locations of the triangles from the upper part of the bone model are reliably estimated. However, many target locations of the triangles from the lower part of the bone model, estimated using the method of ref. 1, will be incorrect. Consequently, the lower part of the bone model 110 is a problematic area and a model element located in this lower area should be excluded from image-driven adaptation. Only the well-initialized model elements located in the upper part of the bone model 100 should become image-driven model elements. During the adaptation these model elements are attracted to the detected target locations in the image. The triangles in the lower part of the bone model interact with each other with internal forces. These forces, which can be derived from the internal energy defined in ref. 1. Section 2.3, Eq. (8) for example, oppose deformations of the bone model tending to preserve the shape of the bone model. Only triangles adjacent to the triangles attracted by the target location will experience some intermediate attraction via internal interactions with the triangles attracted by the target locations.

Figure 1B:
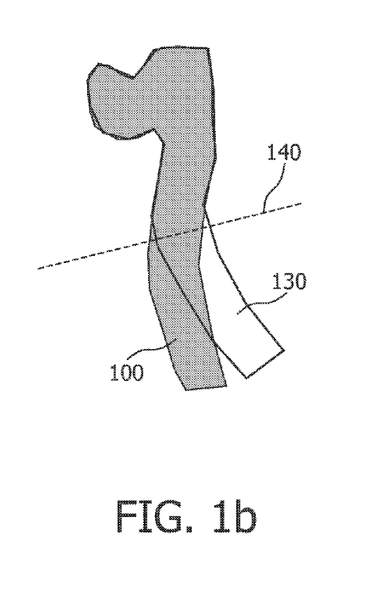

FIG. 1(b) shows the bone model and the bone object of FIG. 1(a) after adaptation. The well-initialized upper part of the bone model is now fitting well the corresponding upper part of the bone object. Also, the area adjacent to the upper part of the bone model fits well the bone object. This is due to the internal forces which shift the triangles in the adjacent area relatively close to the correct target locations and which rotate the triangles of the lower part to preserve the shape of the bone model. Therefore the new upper part of the bone model 130, i.e. the bone model area above the dashed line 140, is well adapted to the bone object 100. This part is now considerably larger than the relatively well-initialized upper part of the bone model in FIG. 1(a).

By iteratively repeating the adaptation process a few times one can grow the well adapted part of the bone model 110 until the whole bone model is well adapted to the bone object 100.

Figure 2:
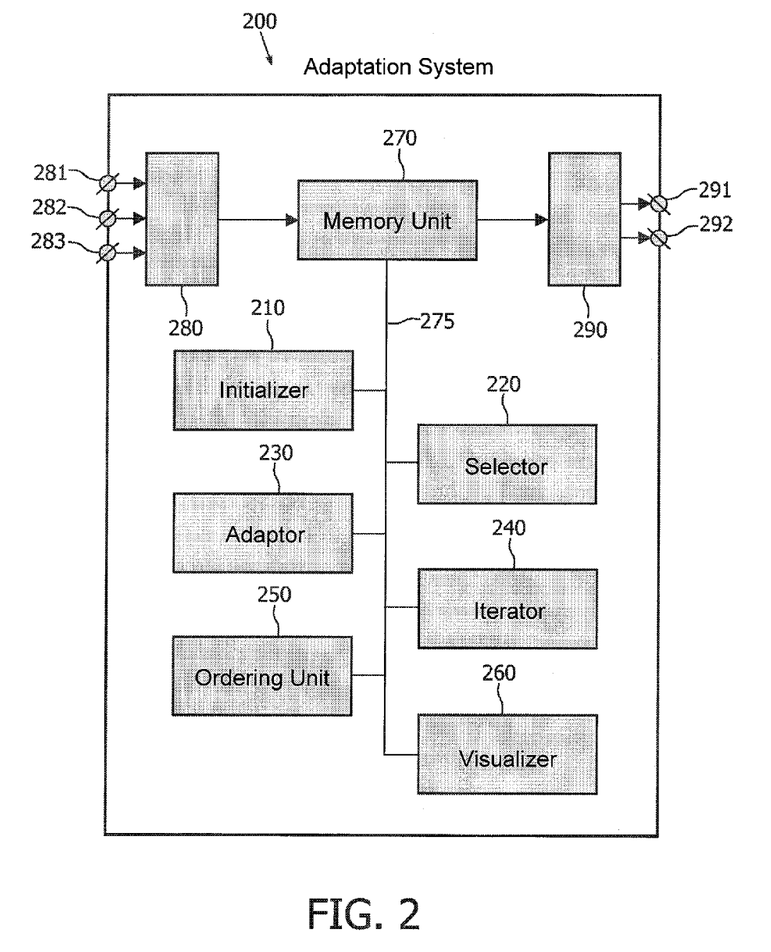
FIG. 2 schematically shows an embodiment of the adaptation system.

FIG. 2 schematically shows an embodiment of the adaptation system 200 for adapting a deformable model comprising a plurality of model elements to an object of interest in an image data set, said system comprising:

an initializer 210 for initializing the deformable model in the image data set;

a selector 220 for selecting at least one image-driven model element from the plurality of model elements; and an adapter 230 for adapting the deformable model on the basis of optimizing a model energy of the deformable model, said model energy comprising an internal energy of the plurality of model elements and an external energy of the at least one image-driven model element, thereby adapting the deformable model.

Optionally the adaptation system 200 also comprises:

an iterator 240 for iteratively adapting the deformable model;

an ordering unit 250 for determining an adaptation order of each of the plurality of model elements;

a visualizer 260 for visualizing the each of the plurality of model elements on the basis of the adaptation order of said each of the plurality of model elements;

a memory unit 270 for storing data such as the image data set, the deformable model and/or the adapted deformable model; and a memory bus 275 for receiving data from and delivering data to the units of the adaptation system 200.

In the embodiment of the adaptation system 200 shown in FIG. 2, there are three input connectors 281, 282 and 283 for the incoming data. The first input connector 281 is arranged to receive data coming in from data storage such as a hard disk or a magnetic tape. The second input connector 282 is arranged to receive data coming in from a user input device such as a mouse or a touch screen. The third input connector 283 is arranged to receive data coming in from a user input device such as a keyboard. The input connectors 281, 282 and 283 are connected to an input control unit 280.

In the embodiment of the adaptation system 200 shown in FIG. 2, there are two output connectors 291 and 292 for the outgoing data. The first output connector 291 is arranged to output the data to data storage such as a hard disk or a magnetic tape. The second output connector 292 is arranged to output the data to a display device. The output connectors 291 and 292 receive the respective data from an output control unit 290.

The skilled person will understand that there are many ways to connect input devices to the input connectors 281, 282 and 283 and the output devices to the output connectors 291 and 292 of the adaptation system 200. These ways comprise, but are not limited to, a wired and a wireless connection, a digital network such as a Local Area Network (LAN) and a Wide Area Network (WAN), the Internet, a digital telephone network, and an analogue telephone network.

The memory unit 270 is arranged to receive an input data from external devices via any of the input connectors 281, 282, and 283 and to store the received input data. Loading the data into the memory unit 270 allows the adaptation system 200 a quick access to relevant data portions by other units of the adaptation system 200. The input data may comprise the image data set and the deformable model data. The memory unit 270 can be implemented by devices such as a Random Access Memory (RAM), a Read Only Memory (ROM), and a hard disk with a disk drive. For example, the memory unit 270 can comprise a RAM for storing an image data set and a ROM for storing a collection of deformable models. The memory unit 270 is arranged to distribute the data such as the image data set and the deformable model via the memory bus 275 to the units of the adaptation system 200. Alternatively, the image data set and other data can be supplied from at least one external device via any of the input connectors 281, 282, and 283 directly to the units of the adaptation system 200 when required by these units. In addition to the above, the memory unit 270 is arranged to receive data from and deliver data to other units of the system comprising the initializer 210, the selector 220, the adapter 230, the iterator 240, the ordering unit 250, and the visualizer 260 via the memory bus 275.

In an embodiment of the adaptation system 200 according to the invention, during a set-up of the adaptation system 200 the image data set is loaded into the memory unit 270. Then the user selects a deformable model to be adapted to the image data set. The initializer 210 is arranged to initialize the deformable model. The initialization may involve, for example, placement of the deformable model near an object of interest, a rigid adaptation and a scaling of the deformable model. These operations may involve a user interaction. Alternatively, the placement, rigid adaptation and scaling can be performed automatically. Optionally, other initialization techniques such as local affine transformations of the deformable model can be also used. The initialized deformable model is stored in the memory unit 270.

The selector 220 is arranged to select the at least one image-driven model element from the plurality of model elements. In an embodiment of the adaptation system 200 according to the invention the selector 220 is arranged to carry out a computation to assist the selecting of the at least one image-driven model element. The selector 220 is arranged to select each of the plurality of model elements as the image-driven model element. The adapter 230, to be described later in more detail, is arranged to compute the locations of model elements corresponding to the optimized model energy yielding a preliminarily adapted deformable model. The adapter 230 is further arranged to store the preliminarily adapted deformable model in the memory unit 270. The selector 220 is arranged to partition the preliminarily adapted deformable model into a number of areas and to compute how well each area fits the image data set. Such a partition can be based on a straightforward cubic grid where an area of the partition comprises locations inside a cube of the cubic grid. The selector 220 is further arranged to compute a similarity measure based, for example, on the Euclidean distance, the square root of the sum of squares of intensity differences at the corresponding locations, between the structures of the preliminarily adapted deformable model and the corresponding structures in the image data set. The selector 220 is arranged to select the model elements with surface elements comprised in the areas having a similarity measure greater than (or a distance less than) a certain predefined threshold, as the image-driven model elements for the proper adaptation.

In a further embodiment of the adaptation system 200 according to the invention the selector 220 is arranged to receive an input for selecting the at least one image-driven model element. The selector 220 is arranged to select every model element as the image-driven model element. The adapter 230, to be described later in more detail, is arranged to compute the locations of model elements corresponding to the optimized model energy yielding a preliminarily adapted deformable model. The adapter 230 is further arranged to store the preliminarily adapted deformable model in the memory unit 270. The selector 220 is arranged to output the preliminarily adapted deformable model and the image data set to a display device connected to the adaptation system 200 via the second output connector 292. The user visually inspects the preliminarily adapted deformable model and the displayed image data set and indicates problematic areas in the preliminarily adapted deformable model. For example, the user can encircle the problematic areas using a user input device such as a mouse or a track ball, connected to the adaptation system 200 via the second input connector 282. The selector 220 is further arranged to receive the user input and to identify the model elements with surface elements comprised outside the encircled areas. Then the selector is arranged to select the identified model elements with surface elements comprised outside the encircled areas as the image-driven model elements for the proper adaptation.

The adapter 230 is arranged to optimize the model energy, for example, to compute the locations and orientations of the model elements corresponding to the minimum of the model energy. The model energy comprises an internal energy contribution, which depends on the locations of the model elements relative to each other. Further, the model energy comprises an external energy contribution, which depends on the locations of the image-driven model elements, selected by the selector 220, relative to the image data set. The external forces, responsible for the external energy contribution, attract the image-driven model elements to their target locations in the image data set and/or repulse the image-driven model elements from the false locations in the image data set. The locations of the model elements corresponding to the minimum of the model energy describe the adapted deformable model. A more detailed description of an example of the model energy can be found in Sections 2.2 and 2.3 of ref. 1.

In a further embodiment of the adaptation system 200 according to the invention optimizing the model energy is based on optimizing the model force field. The field of gradients of the model energy uniquely defines the model force field. Thus, optimizing the model energy can be carried out by means of optimizing the force field. For example, finding locations of model elements corresponding to the minimum of the model energy can be accomplished on the basis of finding locations of model elements corresponding to a model force field substantially mutually equal to a null force field. Optionally, a generalized model force field can further comprise damping forces such as those simulating a viscous flow. The motion of the model elements in this force field can be simulated. The damping forces help the locations of the model elements converge to stable locations corresponding to the optimum model energy. The skilled person will know such simulation methods and therefore these methods are comprised in the scope of the claims of the current application.

In a further embodiment of the adaptation system 200 according to the invention the adaptation system 200 comprises an iterator 240 for iteratively adapting the deformable model. The iterator 240 is arranged to compute a condition for terminating the adaptation process. For example, the iterator is arranged to display the most recently adapted deformable model together with the image data set on a display device connected to the adaptation system 200. The user visually inspects the adapted deformable model and the displayed image data set and decides whether or not there are problematic areas in the deformable model. If the user is not satisfied with the result of the adaptation, the user can set the condition for terminating the adaptation process to not satisfied and indicate the problematic areas. The selector 220 is arranged to continue the adaptation process by selecting the model elements with surface elements comprised outside the indicated areas as the image-driven elements. If the user is satisfied with the result of the adaptation, the user can set the condition for terminating the adaptation process as satisfied. When the condition for terminating the adaptation process is satisfied, the iterator 240 is arranged to terminate the adaptation process.

Alternatively, the condition for terminating the adaptation process is computed without user input. In an embodiment of the current invention the iterator 240 is arranged to partition the adapted deformable model into a number of areas and to compute how well each area fits the image data set. Such a partition can be based on a straightforward cubic grid where an area of the partition comprises locations inside a cube of the cubic grid. The iterator 240 is further arranged to compute a similarity measure based, for example, on the Euclidean distance, the square root of the sum of squares of intensity differences at the corresponding locations, between the structures of the deformable model and the corresponding structures in the image data set. If every area of the partition is such that the similarity measure is greater than (or the distance is less than) a certain predefined threshold then the condition for terminating the adaptation process is satisfied and the iterator 240 is arranged to terminate the adaptation process. Also, if the adaptation fails in the same areas as in the preceding iterative step, the iterator 240 may be arranged to terminate the adaptation process. Otherwise, the iterator 240 is arranged to set the condition for terminating the adaptation process to not satisfied and the selector 220 is arranged to continue the adaptation process by selecting the model elements with surface elements comprised in the areas having the similarity measure greater than (or the distance less than) the certain predefined threshold, as the image-driven areas.

The skilled person will understand that there are many ways to define the conditions for terminating the iterative deformable model adaptation process, which can employ, for example, a more advanced optimization method to maximize the number of the image-driven model elements and/or the similarity measure, and that the described conditions serve only for illustration and do not limit the scope of protection of the current invention.

In a further embodiment of the adaptation system 200 according to the invention the adaptation system 200 comprises an ordering unit 250 for determining an adaptation order of each of the plurality of model elements and wherein the selector 220 is arranged to select the at least one image-driven model element on the basis of the adaptation order and on the basis of an iteration cycle. The ordering unit 250 is arranged to map the model elements onto a set of positive (i.e. greater than 0) integers—the adaptation orders. Let N denote the maximum adaptation order. The selector 220 is arranged to compare the adaptation order of every model element to the iteration count. If the adaptation order of a model element is less than or equal to the iteration count then the selector 220 is arranged to select the model element as an image-driven model element. The iterator 240 is further arranged to increment the iteration count with every iteration cycle. When the iteration count becomes equal to N, all model elements are already selected by the selector 220 as image-driven model elements and the iterator is arranged to terminate the adaptation process.

In an embodiment of the current invention the adaptation order of a model element is predefined and stored with the model element of the deformable model. The ordering unit 250 is arranged to read the adaptation order from a model element stored in the deformable model and to make it available to the units of the adaptation system 200. This approach is especially useful when computing the adaptation order is an intensive and time consuming process.

Alternatively, the ordering unit is arranged to compute the adaptation order of a model element. For example, the deformable model, represented by a triangular mesh, can comprise a region labeled as a reference region. The ordering unit can be arranged to read this reference region and to set the adaptation order of every triangle of the mesh equal to 1 plus the topological distance of the triangle from the reference region. Thus the triangles comprised in the reference region obtain the reference order 1, the triangles adjacent to this region obtain the adaptation order 2, and so on. Alternatively, the ordering unit can be arranged to compute a geometrical distance, for example the Euclidean distance of a triangle to the reference region defined as the distance of the center of the triangle to the closest center of a triangle comprised in the reference region. The geometrical distance can be mapped on a set of adaptation orders, for example, by applying a scaling factor or a scaling function to the geometrical distance, computing the integer part (Entier) function of the product, and adding 1.

In a further embodiment of the adaptation system 200 according to the invention the adaptation order of the each of the plurality of model elements is determined on the basis of a measure of quality of the each of the plurality of model elements. One especially advantageous method of computing the adaptation order of model elements comprised in a triangular mesh representing a deformable model is based on a method for assigning an optimum feature function to a triangle of the triangular mesh. First a set of allowed candidate feature functions has to be identified for each triangle. An example of the candidate function associated with a triangle of the triangular mesh is the gradient at the triangle center location projected on the triangle's normal. In addition, a feature function can depend on some parameters such as the ends of a clipping interval defining the boundaries of the intensities of the image data set at the triangle center location beyond which the feature function is a null function. The boundaries of the clipping intervals can be optimized. Optionally, the feature function comprises a weighted distance penalty term as described in ref. 1, Section 2.1, Eq. (2). Also the weight factor of the distance penalty term can be optimized.

The feature functions are used to detect the target locations of the triangles of the deformable triangular mesh model. These target locations attract the triangle centers. Hence, the quality of the feature functions determines the quality of the target locations and, consequently, the quality of the adaptation process. Therefore it is advantageous to base the adaptation order of a model element on the quality of the corresponding optimized feature function. The method of optimizing the feature functions is based on the simulated search technique. In this technique an ensemble of training image data sets comprising the object of interest, accurately segmented (for example by a manual segmentation procedure) and coded using the same triangular mesh as the one used for representing the deformable model, is used to define an objective function. The contribution of each triangle and of each training image data set to the objective function depends on the distance between the target location of the triangle computed using a candidate feature function and the location of the corresponding triangle in the triangular mesh representing the training image data sets. The objective function accumulates the contributions from all training data sets and from triangles of the triangular mesh. This accumulated distance is optimized over possible selections of the feature functions from the sets of candidate feature functions. The optimum feature functions of the optimized objective function can be stored with the respective model elements, said model elements also comprising the triangles of the triangular mesh. In addition, the quality of a feature function is computed and also can be stored with the respective model element. The ordering unit 250 is arranged to retrieve the adaptation order during the adaptation process. The quality of a feature function is based, for example, on the contribution of the corresponding triangle to the objective function. The feature function qualities are mapped into the set of positive (greater than zero) integers representing adaptation orders of the triangles. Optionally, the ordering unit 250 can be arranged to compute the optimum feature functions and the adaptation orders of model elements.

In a further method of determining the adaptation order of model elements comprised in a triangular mesh representing a deformable model, the adaptation order is based on an anatomical structure. For example, in the case of the femur shown in FIG. 1, the model elements comprised in the femur head can be assigned an adaptation order of 1, the model elements comprised in the first adjacent zone may receive an adaptation order of 2, and so on. In the case of a heart, the model elements comprised in ventricles and atria can receive an adaptation order of 1, the model elements comprised in the pulmonary artery can receive an adaptation order of 2, and so on.

In a further embodiment of the adaptation system 200 according to the invention the adaptation system 200 comprises a visualizer 260 for visualizing the each of the plurality of model elements on the basis of the adaptation order of said each of the plurality of model elements. The adaptation orders are mapped into the visible light spectrum. The smallest adaptation orders are represented in violet while the highest adaptation orders are represented in red. Other mappings, or even other codes such as the grey codes and texture codes are also possible. The color code corresponding to the model element is applied to the surface element of the model element. The visualizer 260 is arranged to transfer the color-coded deformable model to a display device connected to the adaptation system 200, thereby visualizing the adaptability of various areas of the deformable model.

In a further embodiment of the adaptation system 200 according to the invention the adaptation system 200 comprises a set-up unit for allowing the user to set up some optional system parameters, modes of operation, and conditions. For example, the set-up unit may be arranged to select a deformable model for adapting to the object of interest, to limit the maximum number of iterations, and/or to select an option whether or not to create and output a session log file for each use of the adaptation system 200.

The skilled person will understand that other embodiments of the adaptation system 200 according to the invention are also possible. It is possible, among other things, to redefine the units of the system and to reassign their functions. For example, in an embodiment of the adaptation system 200 of the current invention, the selector 120 and the iterator 140 can be implemented as one control unit combining the functions of the two units. In a further embodiment of the adaptation system 100 according to the invention, there can be a plurality of selectors replacing the selector 120 of the previous embodiments, each selector arranged to employ different method of selecting the image-driven elements. The set-up unit can be arranged to select one selector during the set-up phase on the basis of the deformable model.

The initializer 210, the selector 220, the adapter 230, the iterator 240, the ordering unit 250, and the visualizer 260 may be implemented using a processor. Normally, their functions are performed under the control of a software program product. During execution, the software program product is loaded into a memory, like a RAM, and executed from there. The program may be loaded from a background memory, like a ROM, hard disk, or magnetic and/or optical storage, or may be loaded via a network like Internet. Optionally, an application-specific integrated circuit may provide the described functionality.

There are many possible applications of the adaptation system 200 of the current invention. A particularly advantageous application is the application of the adaptation system 200 to medical image data sets. The object of interest in a medical image data set can be, for example, an internal organ, a bone, and/or a blood vessel. Furthermore, the adaptation system 200 of the current invention can be useful in other knowledge domains as long as it is possible to define a deformable model of the object of interest. For example, the system can be useful in cell morphology for adapting deformable models of cell structures to cell objects.

Figure 3:
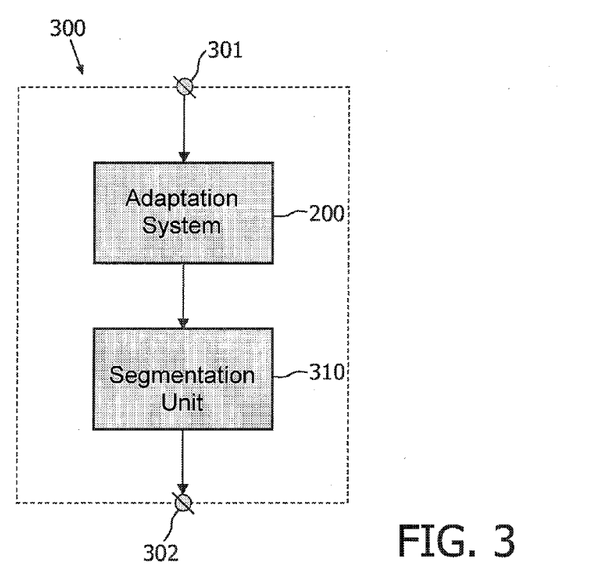
FIG. 3 schematically shows an embodiment of the adaptation system comprising a segmentation unit for segmenting a particular object.

Advantageously, the adaptation system of the invention can be further used for segmenting an image data set. FIG. 3 schematically shows an embodiment of the adaptation system 300 comprising the adaptation system unit 200 connected via an internal connection with a segmentation unit 310, an input connector 301, and an output connector 302. The adaptation system unit 200 is arranged to adapt a deformable object model to an object of interest in the image data set. The adapted deformable model is used by the segmentation unit 310 as a representation of the object of interest. Optionally, the segmentation system 300 can iteratively apply the adaptation system unit 200 and the segmentation unit 310 to another object of interest in the image data set. The segmentation unit 310 may be further arranged to output the registered object models to the output connector 302.

Figure 4:
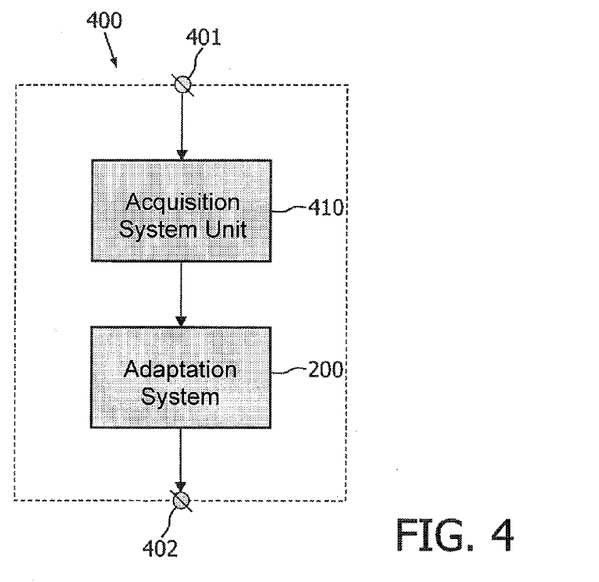
FIG. 4 schematically shows an acquisition unit of the invention.

FIG. 4 schematically shows an embodiment of an image acquisition system 400 employing the adaptation system of the invention, said acquisition system 400 comprising an acquisition system unit 410 connected via an internal connection to the adaptation system 200, an input connector 401, and an output connector 402. This arrangement advantageously increases the capabilities of the image acquisition system 400 providing said acquisition system 400 with robust image processing capabilities of the adaptation system 200. The additional processing capabilities may prove particularly useful when the acquisition system 400 is further arranged for image segmentation. Examples of image acquisition systems are a CT system, an X-ray system, an MRI system, an Ultrasound system, a Positron Emission Tomography (PET) system, and a Single Photon Emission Computed Tomography (SPECT) system.

Figure 5:
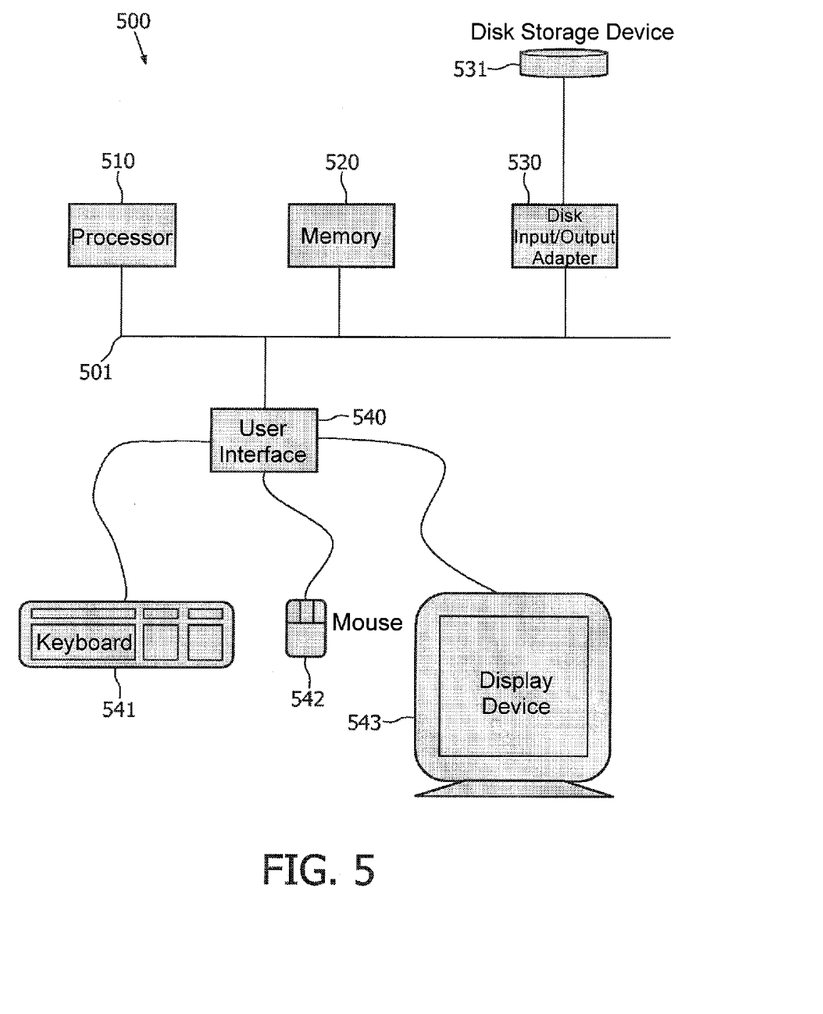
FIG. 5 schematically shows an embodiment of the workstation.

FIG. 5 schematically shows an embodiment of the workstation 500. The system comprises a system bus 501. A processor 510, a memory 520, a disk input/output (I/O) adapter 530, and a user interface (UI) 540 are operatively connected to the system bus 501. A disk storage device 531 is operatively coupled to the disk I/O adapter 530. A keyboard 541, a mouse 542, and a display 543 are operatively coupled to the UI 540. The adaptation system or the segmentation system of the invention, implemented as a computer program, is stored in the disk storage device 531. The workstation 500 is arranged to load the program and input data into memory 520 and execute the program on the processor 510. The user can input information to the workstation 500 using the keyboard 541 and/or the mouse 542. The workstation is arranged to output information to the display device 543 and/or to the disk 531. The skilled person will understand that there are numerous other embodiments of the workstation known in the art and that the present embodiment serves the purpose of illustrating the invention and must not be interpreted as limiting the invention to this particular embodiment.

Figure 6:
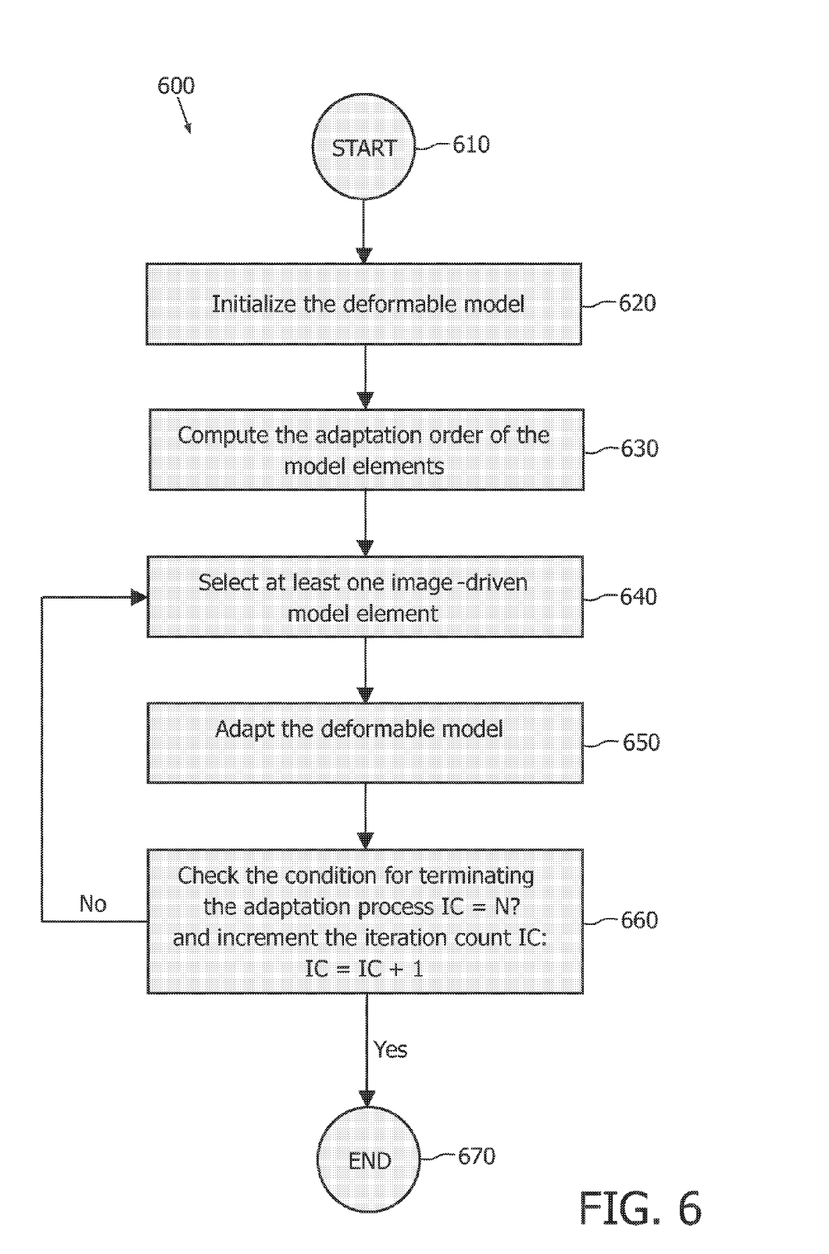
FIG. 6 schematically shows an embodiment of the adaptation method.

FIG. 6 schematically shows an embodiment 600 of the adaptation method. The first step 610 is the Start step. This step comprises the set-ups that are done in the current embodiment of the method such as setting up an iteration count IC to 1. In the Initialize the deformable model step 620 the deformable model is initialized in the image data set. The initializing step may involve, for example, placement of the deformable model near the object of interest, a rigid adaptation and a scaling of the deformable model. In the Compute the adaptation order of the model elements step 630 the adaptation order of the model elements comprised in the plurality of the model elements of the deformable model is computed, for example, on the basis of the topological distance from a reference region. In the Select at least one image-driven model element step 640 the model elements are classified on the basis of the adaptation order. The model elements of adaptation order less than or equal to IC become the image-driven model elements. In the Adapt the deformable model step 650 the model energy is optimized, for example minimized. The image-driven model elements interact with the image data set and all elements interact with each other. The optimum configuration of the deformable model, i.e. the locations of model elements corresponding to the minimum of the model energy, defines the adapted deformable model. In the Check the condition for terminating the adaptation process and increment the iteration count IC step 660 the iteration count is compared to the maximum adaptation order N. If IC<N then the IC is incremented by one and next the Select at least one image-driven model element step 640 is performed. If IC=N the END step 670 of the adaptation method is performed. Optionally, the termination criterion can be additionally based on a measure of the quality of the adapted deformable model. If the adapted deformable model fits well the image data set then the END step 670 of the adaptation method is performed. Using additional or alternative termination criteria is also possible. The terminating END step 670 may comprise outputting the results of the adaptation process.

The adaptation system 200 of the invention may be implemented as a computer program product and can be stored on any suitable medium such as, for example, magnetic tape, magnetic disk, or optical disk. This computer program can be loaded into a computer arrangement comprising a processing unit and a memory. The computer program product, after being loaded, provides the processing unit with the capability to carry out the detecting, registering and/or segmenting tasks.

The order in the described embodiments of the method of the current invention is not mandatory, the skilled person may change the order of steps or perform steps concurrently using threading models, multi-processor systems or multiple processes without departing from the concept as intended by the present invention.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The invention can be implemented by means of hardware comprising several distinct elements and by means of a suitably programmed computer. In the system claims enumerating several units, several of these units can be embodied by one and the same item of hardware or software. The usage of the words first, second and third, etcetera does not indicate any ordering. These words are to be interpreted as names.

The invention claimed is:

1. An adaptation system for adapting a deformable model comprising a plurality of model elements to an object of interest in an image data set, said system comprising:

a processor configured to:

display, with a display monitor, the image data set, wherein the image data set is generated by an imaging system and the object of interest has a first shape;

retrieve a deformable model, where the deformable model includes a model of the object of interest represented through a plurality of image-driven model elements, wherein the deformable model is a polygonal mesh and each image-driven model element is a polygon of the polygonal mesh, each of the image-driven model elements includes information regarding a shape, a location and an orientation of a different area of a surface of the deformable model, and the deformable model has a second shape, which is not the same as the first shape;

initialize the deformable model by superimposing the deformable model at least partially over the object of interest;

compute a new location for each of the image-driven model elements based on an internal energy between the image-driven model elements and an external energy between the image-driven model elements and target locations on the object of interest; and adapt the deformable model by changing its shape based on the new locations so that the deformable model has a third shape, which is closer to the first shape of the object of interest than the second shape, producing an adapted deformable model, wherein the processor iteratively adapts the deformable model to the object of interest, wherein the processor determines an adaptation order of each of the plurality of model elements and selects the at least one image-driven model element based on the adaptation order and on the iteration cycle, and wherein the adaptation order of the each of the plurality of model elements is determined based on a measure of quality of each of the plurality of model elements.

2. The adaptation system as claimed in claim 1 wherein the processor segments the structure of interest based on the adapted deformable model.

3. The adaptation system as claimed in claim 1 wherein the structure of interest is anatomical tissue.

4. A workstation comprising the adaptation system as claimed in claim 1.

5. The adaptation system as claimed in claim 1, wherein the processor is further configured to:
 partition the adapted deformable into a plurality of sub-areas, each including a sub-set of the plurality of image-driven model elements;
 determine a similarity metric for each of the sub-areas between a sub-area and a corresponding area of the structure of interest;
 identify a sub-set of the sub-areas that have a similarity metric that satisfies a predetermine threshold for a second adaption;
 compute a subsequent location for each of the image-driven model elements based on the internal energy between each of the image-driven model elements of the sub-set and the external energy between each of the image-driven model elements of the sub-set and the target locations on the structure of interest; and
 adapt the adapted deformable model by changing its shape based on the subsequent locations so the that deformable model has a third shape, which is closer to the first shape of the structure of interest than the second shape, producing a second adapted deformable.

6. The adaptation system as claimed in claim 5, wherein the processor is further configured to:
 partition the second adapted deformable into another plurality of sub-areas, each including a sub-set of the plurality of image-driven model elements;
 determine a similarity metric for each of the sub-areas between a sub-area and a corresponding area of the structure of interest;
 identify a sub-set of the sub-areas that have a similarity metric that satisfies a predetermine threshold for a second adaption;
 compute a subsequent location for each of the image-driven model elements based on the internal energy between each of the image-driven model elements of the sub-set and the external energy between each of the image-driven model elements of the sub-set and the target locations on the structure of interest; and
 adapt the second adapted deformable by changing its shape based on the subsequent locations so the that deformable model has a fourth shape, which is closer to the first shape of the structure of interest than the third shape, producing a third adapted deformable model.

7. The adaptation system as claimed in claim 5, wherein the similarity metric is based on a Euclidian distance or a square root of a sum of squares of intensity differences between the sub-area of the deformable model and the corresponding area of the structure of interest.

8. The adaptation system as claimed in claim 5, wherein the processor terminates processing in response to the similarity metrics for a sub-set of the sub-areas failing to satisfy the predetermined threshold.

9. The adaptation system as claimed in claim 5, wherein the processor removes image-driven model elements corresponding to similarity metrics that fail to satisfy the predetermined threshold and continues adapting the deformable model based on image-driven model elements corresponding to similarity metrics that satisfy the predetermined threshold.

10. The adaptation system as claimed in claim 5 wherein the processor receives a user input identifying at least one image-driven model element that is outside of the sub-set of the sub-areas, and includes the at least one image-driven model element with the sub-set of the sub-areas for the adaptation.

11. The adaptation system as claimed in claim 5 wherein the processor terminates processing in response to the similarity metrics for every one of the sub-areas satisfying the predetermined threshold.

12. The adaptation system as claimed in claim 1, wherein the processor, for computing the new location for an image-driven model element, computes a location and an orientation of the image-driven model element corresponding to a minimum of an energy model, where the energy model includes the internal energy and the external energy.

13. The adaptation system as claimed in claim 12 wherein the processor finds the minimum of the energy model by finding locations of the model elements corresponding to a model force field mutually equal to a null force field.

14. The adaptation system as claimed in claim 13 wherein the model force field further includes damping forces, which stabilize locations corresponding to the optimum energy model.

15. The adaptation system as claimed in claim 1, wherein the external energy attracts the image-driven model element to the corresponding target location of the structure of interest and repulses the image-driven model element from a non-corresponding target location of the structure of interest.

16. A method of adapting a deformable model comprising a plurality of model elements to an object of interest in an image data set, said method comprising:
 displaying, with a display monitor, the image data set, wherein the image data set is generated by an imaging system and the object of interest has a first shape;
 retrieving a deformable model, where the deformable model includes a model of the object of interest represented through a plurality of image-driven model elements, wherein the deformable model is a polygonal mesh and each image-driven model element is a polygon of the polygonal mesh, each of the image-driven model elements includes information regarding a shape, a location and an orientation of a different area of a surface of the deformable model, and the deformable model has a second shape, which is not the same as the first shape;
 initializing the deformable model by superimposing the deformable model at least partially over the object of interest;
 computing a new location for each of the image-driven model elements based on an internal energy between the image-driven model elements and an external energy between the image-driven model elements and target locations on the object of interest, wherein the processor, for computing the new location for an image-driven model element, computes a location and an orientation of the image-driven model element corresponding to a minimum of an energy model, where the energy model includes the internal energy and the external energy, wherein the processor finds the minimum of the energy model by finding locations of the model elements corresponding to a model force field mutually equal to a null force field; and adapting the deformable model by changing its shape based on the new locations so the that the deformable model has a third shape, which is closer to the first shape of the object of interest than the second shape, producing an adapted deformable model.

17. An adaptation system for adapting a deformable model comprising a plurality of model elements to an object of interest in an image data set, said system comprising:

a processor configured to:
- display, with a display monitor, the image data set, wherein the image data set is generated by an imaging system and the object of interest has a first shape;
- retrieve a deformable model, where the deformable model includes a model of the object of interest represented through a plurality of image-driven model elements, wherein the deformable model is a polygonal mesh and each image-driven model element is a polygon of the polygonal mesh, each of the image-driven model elements includes information regarding a shape, a location and an orientation of a different area of a surface of the deformable model, and the deformable model has a second shape, which is not the same as the first shape;
- initialize the deformable model by superimposing the deformable model at least partially over the object of interest;
- compute a new location for each of the image-driven model elements based on an internal energy between the image-driven model elements and an external energy between the image-driven model elements and target locations on the object of interest; and
- adapt the deformable model by changing its shape based on the new locations so that the deformable model has a third shape, which is closer to the first shape of the object of interest than the second shape, producing an adapted deformable model, where the processor iteratively adapts the deformable model to the object of interest, and wherein the processor is further configured to:
- partition the adapted deformable into a plurality of sub-areas, each including a sub-set of the plurality of image-driven model elements;
- determine a similarity metric for each of the sub-areas between a sub-area and a corresponding area of the structure of interest;
- identify a sub-set of the sub-areas that have a similarity metric that satisfies a predetermine threshold for a second adaption;
- compute a subsequent location for each of the image-driven model elements based on the internal energy between each of the image-driven model elements of the sub-set and the external energy between each of the image-driven model elements of the sub-set and the target locations on the structure of interest; and
- adapt the adapted deformable model by changing its shape based on the subsequent locations so the that deformable model has a third shape, which is closer to the first shape of the structure of interest than the second shape, producing a second adapted deformable.

* * * * *